United States Patent
Khitrik et al.

(10) Patent No.: US 7,336,959 B2
(45) Date of Patent: Feb. 26, 2008

(54) INFORMATION TRANSMISSION METHOD FOR A WIRELESS LOCAL NETWORK

(75) Inventors: Semen Aleksandrovich Khitrik, St. Petersburg (RU); Aleksandr Nikolaevich Kirdin, St. Petersburg (RU); Yury Pavlovich Sukharnikov, St. Petersburg (RU)

(73) Assignee: Airgain, Inc., Carlsbad, CA (US)

( * ) Notice: Subject to any disclaimer, the term of this patent is extended or adjusted under 35 U.S.C. 154(b) by 0 days.

(21) Appl. No.: 11/371,537

(22) Filed: Mar. 8, 2006

(65) Prior Publication Data

US 2006/0154673 A1 Jul. 13, 2006

Related U.S. Application Data

(63) Continuation of application No. 10/494,103, filed as application No. PCT/RU02/00490 on Oct. 31, 2002, now Pat. No. 7,043,252.

(30) Foreign Application Priority Data

Nov. 1, 2001 (RU) ............................... 2001130431

(51) Int. Cl.
*H04Q 7/20* (2006.01)
(52) U.S. Cl. ............................... 455/452.2; 455/432.3; 455/435.3; 455/447; 455/450; 455/451; 455/452.1; 455/453; 455/454
(58) Field of Classification Search ................ 300/342, 300/320, 449, 338; 455/88, 41.1, 41.2
See application file for complete search history.

(56) References Cited

U.S. PATENT DOCUMENTS

| | | | |
|---|---|---|---|
| 4,987,536 A | 1/1991 | Humblet | |
| 6,115,580 A | 9/2000 | Chuprun et al. | |
| 6,275,500 B1 * | 8/2001 | Callaway et al. | 370/449 |
| 6,615,024 B1 | 9/2003 | Boros et al. | |
| 6,754,188 B1 | 6/2004 | Garahi et al. | |
| 6,782,241 B2 * | 8/2004 | Kobayashi | 455/88 |
| 6,804,532 B1 * | 10/2004 | Moon et al. | 455/552.1 |
| 6,975,613 B1 * | 12/2005 | Johansson | 370/338 |
| 7,016,673 B2 * | 3/2006 | Reddy et al. | 455/426.2 |
| 2002/0075940 A1 * | 6/2002 | Haartsen | 375/132 |
| 2002/0094778 A1 | 7/2002 | Cannon et al. | |
| 2002/0141375 A1 * | 10/2002 | Choi | 370/347 |
| 2003/0081603 A1 * | 5/2003 | Rune | 370/390 |

FOREIGN PATENT DOCUMENTS

| | | |
|---|---|---|
| EP | 0481171 | 4/1992 |
| EP | 1117270 | 7/2001 |
| RU | 2037961 | 6/1995 |
| RU | 2117396 C1 | 10/1998 |
| WO | PCT/SE00/00633 | 10/2000 |
| WO | PCT/US00/41180 | 4/2001 |
| WO | WO 01/030035 A3 | 4/2001 |

* cited by examiner

*Primary Examiner*—David Nguyen
(74) *Attorney, Agent, or Firm*—Procopio, Cory, Hargreaves & Savitch LLP

(57) ABSTRACT

A communication network includes a plurality of transceivers in spaced-apart locations A transmission from one of the transceivers to a selected receiver destination can be optimized by sending the transmission along optimum quality path segments from transceiver to transceiver. The optimum path segments are determined conveniently by comparing consecutive entries in a link quality table. Each transceiver may include a direction-agile antenna, which is oriented in the direction to optimize transmission and reception of each received data packet.

15 Claims, 5 Drawing Sheets

|  | Transceiver 1 | Transceiver 2 |  | Transceiver N |
|---|---|---|---|---|
| Transceiver 1 |  | Communi-cation quality Signal/noise |  | Communi-cation quality Signal/noise |
| Transceiver 2 | Communi-cation quality Signal/noise |  |  | Communi-cation quality Signal/noise |
|  |  |  |  |  |
| Transceiver N | Communi-cation quality Signal/noise | Communi-cation quality Signal/noise |  |  |

Fig. 3

INFORMATION TRANSMISSION METHOD FOR A WIRELESS LOCAL NETWORK

CROSS-REFERENCE TO RELATED APPLICATION

This application is a continuation of U.S. patent application Ser. No. 10/494,103, filed Sep. 2, 2004, now U.S. Pat. No. 7,043,253 which is a U.S. National Application of PCT/RU02/00490, filed Oct. 31, 2002, which claims priority to Russian Application No. 2001130431, filed Nov. 1, 2001, all of which are hereby incorporated by reference.

FIELD OF THE INVENTION

The invention claimed herein refers to wireless local communication networks (WLAN) that include multiple users capable of establishing communication with one another (i.e. operating in a peer-to-peer mode), in particular, to methods for transmitting various types of information used in such networks.

BACKGROUND ART

At present wireless local area networks are gaining wide recognition in the field of information science and video graphic communication for the purpose of transmitting and distributing data among multiple users located in one building (for example, among PCs, laptops, PDAs, printers and other users) without limiting the "mobility" of said users. Transmission of information with the use of WLANs reduces the cost of network because there is no need for laying connecting wires. A network of this type can be also used in cases when it is difficult or simply impossible to lay connecting wires and in cases when there are no socket connectors for local networks due to architectural limitations. WLAN is an ideal solution for companies and institutions in which users are often rearranged within premises. As a rule, existing WLANs are built based on the principle of equal rights of all network users, and radio communication in existing WLANs is arranged according to well-known international standards—e.g. standards IEEE 802.11, IEEE 802.11a, IEEE 802.11b and ISO 8802-11, HIPERLAN of type 2.

The distinguishing feature of WLAN consists in the fact that communication quality (and, hence, data transmission rate between two users) depends heavily upon a number of factors and in addition, communication quality is not constant in time. For example, the standards indicated above provide that four data transmission rates—11, 5.5, 2 and 1 Mbps—are to be used depending on communication quality. According to these standards, the rate of data transmission is to be set stage by stage, at first transmission is performed at a rate of 11 Mbps, and with poor quality of communication the rate of data transmission is decreased step-by-step. When the quality of communication between two users is very poor, data exchange is carried out at a rate of 1-2 M bps. Such a switchover from one data transmission rate to another one results in the increase in time of information transmission from one user to another.

Methods are known in which communication is arranged in a wireless local network between users, which are unable to transmit information directly to one another (See U.S. Pat. No. 4,987,536; EP Patent Nos. 0,481,171 and 1,117,270; Russian Patent No. 2,037,961 and PCT Patent Application Nos. PCT/SE00/00633 and PCT/US00/41180).

For example, in a known method for data transmission in a wireless computer network (See PCT Patent Application No. PCT/US00/41180) each of the users determines one or more "labeled routing trees"—i.e. shortest paths for communication links with other users. Then each user sends "labeled routing trees" (built by him) to other users who store them and then form the common "labeled routing tree" of the shortest path for data exchange with other network users based on stored individual "labeled routing trees".

The known method, while providing for the transmission of messages to addressees by the shortest pathway, doesn't take into account the fact that in some sections of the selected route, the quality of communication may be not good enough, and, hence the rate of data transmission to users would be low.

It has to be pointed out here that when the quality of communication between a pair of users in WLANs built in accordance with the principle of equal rights for all network users is poor, there is often a third user, the quality of communication of which with both users from the said pair of users is good and who is capable of exchanging data with both of them at a rate of 5.5 or 11 Mbps.

It terms of the set of the most essential features, the closest analog to the invention claimed herein is the method for radio communication in a wireless local area network (See U.S. Pat. No. 6,115,580) that includes the determination of the quality of user-to-user links, with said quality being determined based on calculations of terrain information and location of users, storage of said calculated data on the quality of user-to-user links between all users and transmission of information to an addressee (out of the number of users located on information transmission route) who is characterized by good communication quality (calculated at the first stage).

The known method for selecting a route for transmitting information to an addressee based on calculated data on his current location doesn't allow one to take into account actual conditions of communication between users (presence of moving obstacles within WLAN operation area, radio interference/noise and the like).

SUMMARY OF THE INVENTION

The purpose of the present invention consists in creating such a method for data transmission in a wireless local area network, which would make it possible to improve the quality and reliability of communication for network users (including mobile network users), thus raising the data transfer rate.

The invention is based on the recognition that in a WLAN, which includes a plurality of transceivers in spaced-apart locations, a transmission from one of the transceivers to a selected receiver destination can be optimized by sending the transmission along optimum quality path segments from transceiver to transceiver. The optimum path segments are determined conveniently by comparing consecutive entries in a link quality table. Each transceiver may include a direction-agile antenna, which is oriented in the direction to optimize transmission and reception of each received data packet.

This advantage is achieved due to the fact that following steps are carried out in a method for radio communication in a wireless local network consisting of a multitude of transceivers capable of communicating in a peer-to-peer mode:

Determination of the quality of communication between all transceivers of WLAN,

Storage by each network transceiver of received data on quality of communication between all pairs of transceivers of the network, Transmission of information by a transceiver operating in the transmission mode to an addressee out of the number of this network transceivers along the information transmission route that provides for the quality of communication that is equal to or better than a specified threshold value of communication quality. Said transmission is performed using at least one intermediate transceiver out of the number of this network transceivers as a retransmitter.

In the particular case, determination of said quality of communication between all transceivers of WLAN may be conducted in the following manner:

Each transceiver of this network transmits an identification signal that includes data on quality of communication with other transceivers of this network, Each transceiver of this network receives an identification signal from other transceivers of this network.

To increase the communication range, reception of identification signal can be performed when the antenna beam is positioned in the direction of transceiver operating in the transmission mode.

It is desirable to take data on the quality of communication in the peer-to-peer operation mode with said addressee as a specified threshold value.

The quality of communication can be determined based on the level of received signal or on the signal-to-noise ratio.

Transmission of information by transceivers to addressees by a selected route can be conducted at a rate determined using the stored data on the quality of communication between them.

Stored data on the quality of communication can be taken as the current values for the purpose of subsequent transmission of information to said addressee.

Since conditions of radio communication between transceivers in WLAN may vary in time, it is desirable to repeat the cycle of said determination of the quality of communication and the storage of said data on communication quality periodically. These cycles can be repeated at a time interval from 0.1 s to 100 s.

Following the repetition of the cycle of said determination of the quality of communication between WLAN transceivers, data stored in the previous cycle are replaced with data on communication quality obtained in the current cycle and then the storage of the newly obtained data is arranged. Effective monitoring of changes in WLAN radio space may be conducted in the following manner. Data on communication quality stored after a previous said cycle are compared with data on communication quality stored after the next cycle and when data values of both cycles are the same, the time interval between cycles of communication quality determination is either kept the same as it was or increased. When data on communication quality stored after a previous cycle are different from data obtained and stored after the next cycle, the interval between cycles is decreased.

In that way, the invention claimed herein significantly improves the average data transfer rate in a WLAN providing either direct data transfer between users or engaging intermediate stations in the WLAN as retransmitters, depending on the link quality of all available communication routes between these users.

A wireless local area network (for which the method claimed herein is intended), includes a plurality of spaced-apart transceivers, with each of the transceivers including first means for transmitting separately an identification code including data on the quality of communication in the transmission path between it and each other of the plurality of transceivers; second means for receiving the identification code for each of the other transceivers in plurality of the transceivers and for real time determination from the above-mentioned data of each quality of communication for the best path available and third means responsive to the receipt of the identification codes for other transceivers for storing data representative of the quality of communication between each pairs of the transceivers of said network.

Each of the transceivers normally is operating in the receiving mode and each of the transceivers includes user responsive means for switching to the transmitting mode.

The transceiver operating in the transmitting mode includes means for transmitting to a selected addressee receiving transceiver, which means provides for a quality of transmission at least equal to a specified threshold.

The intermediate transceiver is selected using the stored data on the quality of communication between all pairs of said plurality of transceivers in such a way, as it is located on the highest quality communication route between the transmitting transceiver and the addressee transceiver.

A communication path is constructed in real time mode using a sequence of the transceivers in a relay from an initiating transmitting transceiver to an intended recipient transceiver.

Each of said transceiver may further include control means responsive to the receipt of a transmission for terminating the transmission of the identification code.

Each of said plurality of transceivers may further include a direction agile antenna means responsive to the transmission for orienting the antenna in the direction in which transmission is received.

The means for storing includes a link quality table. It may also include means for periodically updating said link quality table with the updating period being either pre-specified in advance or a function of frequency of changes in the quality of communication.

Each of the transceivers may further include means for comparing quality data for each of consecutive transmission of identification code transmissions and for controlling the interval between consecutive identification code transmissions.

Each transceiver may further include means for receiving and re-transmitting data packets not addressed thereto, and each of the transceiver also can include means for selecting a highest quality path segment to an intermediate other transceiver in said network for relaying said packet to the receiver to which the packet is directed.

Each of the transceivers also includes means for determining a highest quality transmission path between itself and different other transceivers in said network.

A wireless local area network may include a plurality of transceivers in spaced-apart location, with each of these transceivers including means responsive to receipt of a data packet intended for a different transceiver for re-transmitting data packet along a highest quality transmission path.

A transceiver for a wireless local area network includes means for determining in successive periods the quality of communication of the transmission paths between said transceiver and each of other transceivers in said network and for storing data represented of said quality for successive ones of said periods.

A transceiver may also include means for comparing quality of transmission path data in successive consecutive ones of the periods for varying the intervals between the periods.

Each of the transceivers (which normally is in the receiving mode) may further include user responsive means for switching from the receiving mode to the transmission mode for transmitting a data packet and means responsive to the reception of a data packet being transmitted to a different receiver for re-transmitting said data packet along a highest quality communication path. It may also include means for determining said highest quality communication path from said stored data representative of said quality.

The transceiver may also include means responsive to the receipt of a data packet for terminating the transmission of said identification codes.

The transceiver may further include a direction agile antenna and means responsive to the receipt of a data packet for re-orienting the antenna in the direction from which the data packet was received.

BRIEF DESCRIPTION OF THE DRAWINGS

The various embodiments, features and advances of the present invention will be understood more completely hereinafter as a result of a detailed description thereof in which reference will be made to the following drawings:

FIG. 3—presents an example of a Table of stored data on communication quality (s/n—is the designation used for signal-to-noise ratio);

DETAILED DESCRIPTION OF A PREFERRED EMBODIMENT

Figure 1:
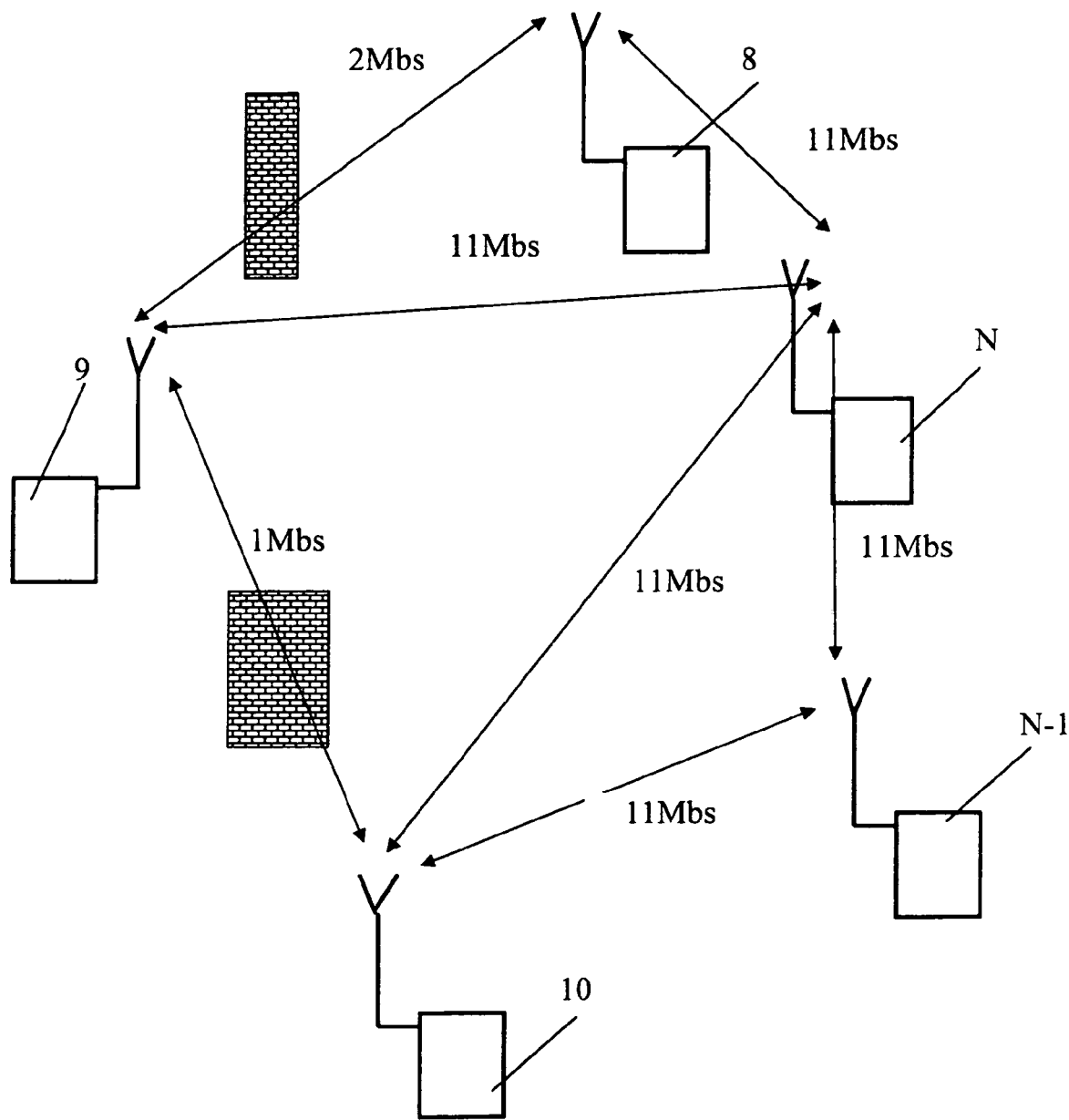
FIG. 1—schematically illustrates the operation of transceivers in existing WLANs.
Figure 5:
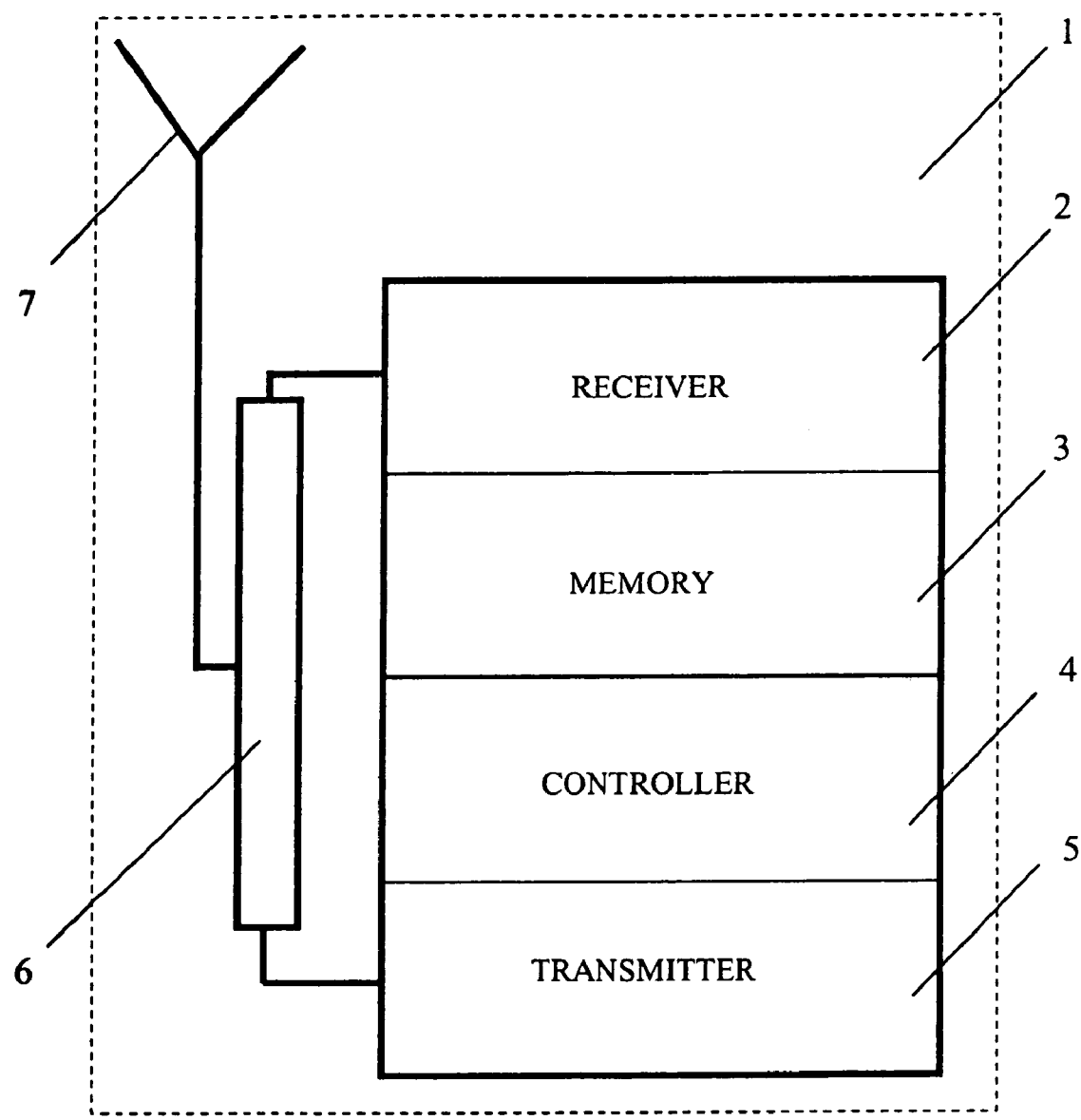
FIG. 5—schematically shows a WLAN transceiver used in the data transmission method claimed herein.

Transceiver 1 (FIG. 5), which is used for the implementation of the data transmission method in WLAN claimed herein includes a receiver 2, memory block 3, controller 4, transmitter 5 and reception/transmission switch 6, to which antenna 7 is connected. A wireless local network (for which the method claimed herein is intended—see FIG. 1) includes a multitude of users 8, 9, 10, . . . N, each of which is equipped with transceiver 1. Users 8, 9, 10, . . . N are capable of direct communication with one another (i.e. capable of operating in the peer-to-peer mode), but the quality of communication between some of these users is not good enough. For example, due to radio interference (mentioned above) the quality of communication between users 8 and 9 is so that data exchange between them can be carried out only at a rate of 2 Mbps, while the quality of communication between users 9 and 10 is so that data exchange between them can be carried out at a rate of no greater than 1 Mbps (FIG. 1).

In accordance with the method for data transmission in WLAN claimed herein, first the quality of communication between all users 8, 9, 10, . . . N is determined. Determination of the communication quality may be performed, for example, in the following manner. Each of the transceivers 1 of users 8, 9, 10 . . . N transmits an identification signal that includes data on the quality of communication with other transceivers of WLAN and receives from other devices the same identification signals. To increase the reception range, reception of identification signals by transceivers may be performed when their antenna beams are positioned in the direction of the transceiver device that is in the transmission mode. Each of the transceivers 1 of users 8, 9, 10, . . . N retrieves data on the quality of communication from received identification signals and stores these data as current values for the purpose of subsequent transmission of information to a specific addressee in the network. Storage of communication quality data by each of the transceivers 1 of users 8, 9, 10, . . . N may be carried out, for example, in a communication quality Table (called the Link Quality Table)—that is arranged in the form of a two-dimensional array containing information on the quality of communication between all pairs of transceivers 1 out of the set of users 8, 9, 10, . . . N (FIG. 3). The quality of communication can be determined for example based on the level of a signal being received or on the signal-to-noise ratio. The Link Quality Table can be updated periodically to maintain the adequate reliability of information contained in it. Updated data for the Table are obtained as a result of periodical repetitions of the cycle consisting in the transmission of identification signals by each of the WLAN transceivers 1 of users 8, 9, 10 . . . N to all other transceivers in WLAN, in the reception of corresponding identification signals from each of the WLAN transceivers 1 of users 8, 9, 10, . . . N and storage of received data on communication quality. The update period for the Link Quality Table may be either specified in advance (for example, at a specified time interval from 0.1 s to 100 s) or it can be changed dynamically according to the frequency of changes in the quality of communication between WLAN transceivers 1 of users 8, 9, 10, . . . N. For this purpose each of the transceivers 1 of users 8, 9, 10, . . . N compares communication quality data stored after a previous cycle with those obtained as a result of the next cycle. If data on communication quality stored after a previous cycle and data on communication quality stored after the next cycle are the same, the interval between said cycles is kept the same as it was or increased. If data on communication quality obtained as a result of the last cycle differ from those stored after a previous cycle, the time interval between cycles is decreased. Data on communication quality, put down in the Link Quality Table after a previous cycle are then replaced with data on communication quality obtained as a result of the last cycle conducted to be used as current values. Besides the method described above, storage and processing of data on communication quality can be carried out by any other known method. Transmission of information by a transceiver operating in the transmission mode to an addressee out of the number of WLAN transceivers (via intermediary transceivers) is made by a transmission route that provides for the quality of communication that is equal to or better than a specified threshold value of communication quality which is selected using the stored current values of data on communication quality. Transmission of information to an intermediary is conducted at a rate determined based on stored data on the quality of communication with this specific intermediary. Usually the quality of direct connection with an addressee (peer-to-peer connection) is taken as said threshold value.

TECHNICAL APPLICABILITY

Figure 2:
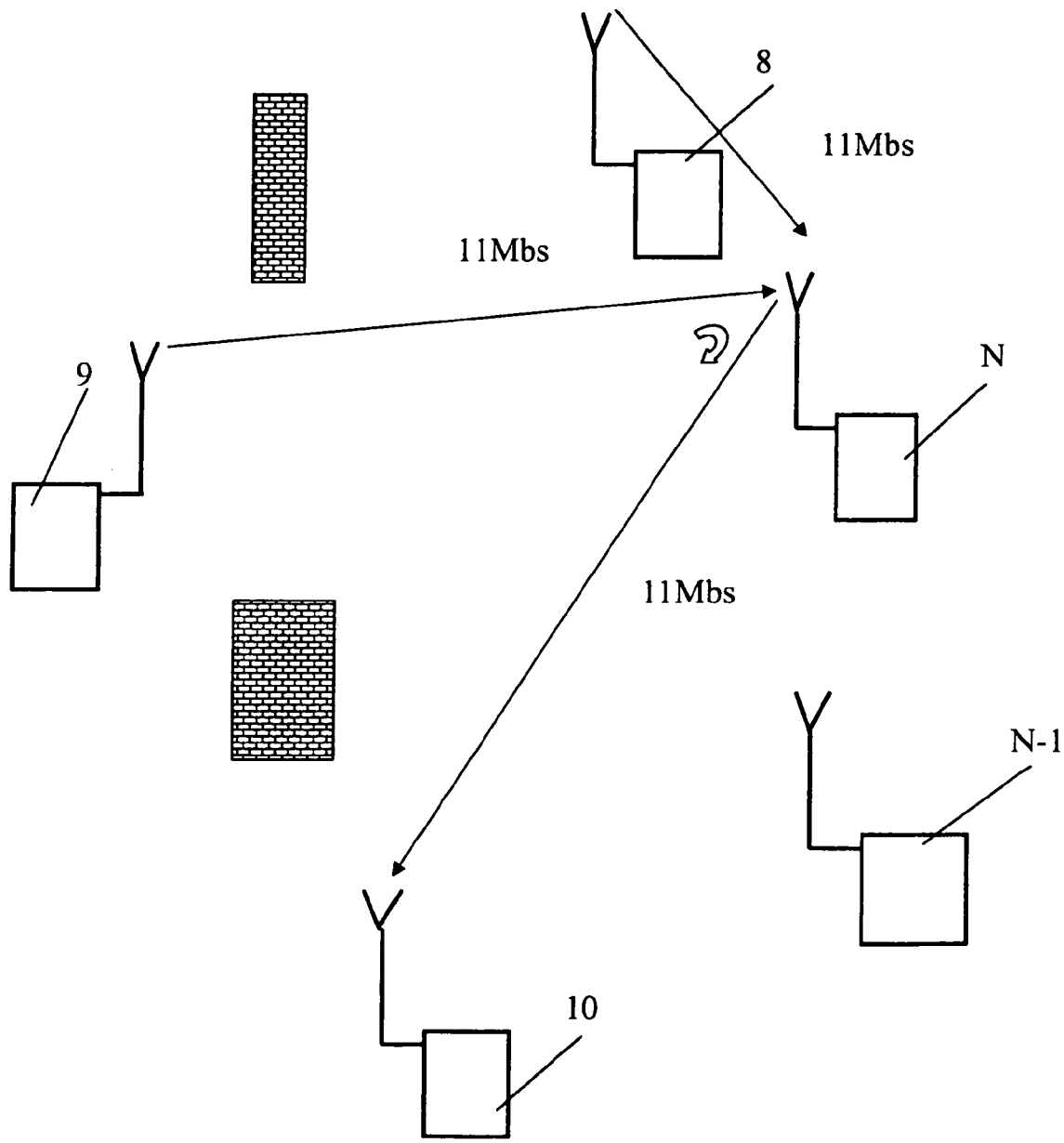
FIG. 2—presents an example of radio communication session in a WLAN in accordance with the present invention.
Figure 4:
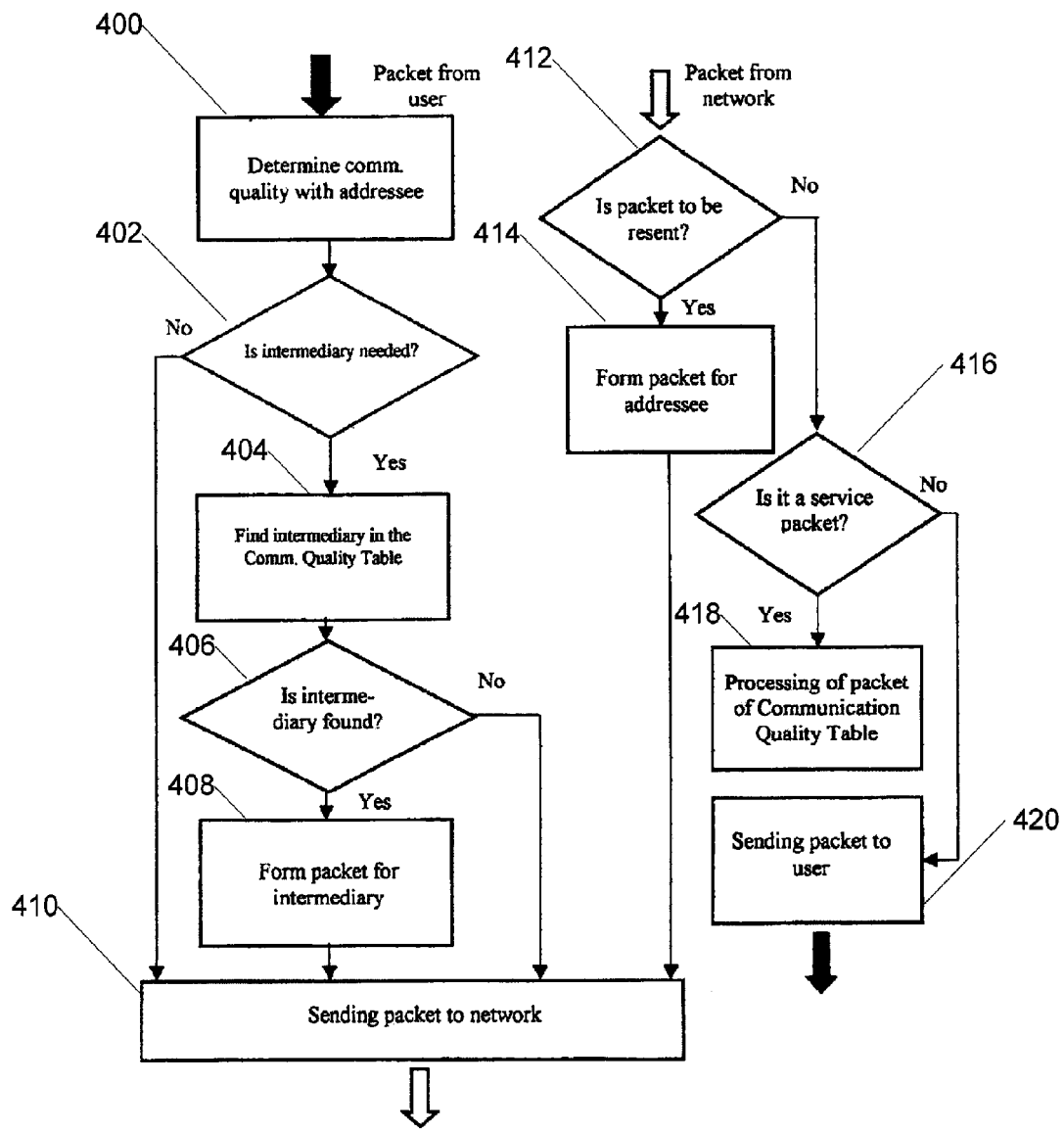
FIG. 4—schematically illustrates the sequence of steps carried out by a WLAN transceiver in the course of data transmission.

Using the method described above the authors have conducted the transmission of information to addressees in WLAN in accordance with IEEE standards 802.11b and ISO 8802-11 (FIG. 2, FIG. 3, and FIG. 4). Data are transmitted in packets in such WLANs. Upon the reception from a user 9 of data packet to be re-transmitted to user 10 and prior to re-transmitting this packet to the addressee, transceiver 1 checks the quality of communication with this addressee using the Link Quality Table for this purpose. Since the quality of communication with the addressee is poor in our case (data transmission at a rate of 2 Mbps), transceiver 1 looks for an intermediary in the Link Quality Table capable of transmitting said data packet to user 10 at a higher rate and finds such an intermediary-transceiver 1 of user N. In this case, transceiver 1 of user 9 adds service information about the addressee to the said data packet and sends the latter via transceiver 1 of user N to the addressee (i.e. transceiver 1 of user 10). In another case—for example, when it is needed to transmit data from transceiver 1 of user 8 to transceiver 1 of user N—the quality of communication between them is quite good (which fact is determined based on the Link Quality Table)—11 Mbps. Hence, transceiver 1 of user 8 sends this data packet directly to transceiver 1 of user N (no intermediary is involved in this case).

With reference to FIG. 4, the sequence of steps carried out by a WLAN transceiver in the course of data transmission is schematically illustrated. Initially, a packet may be received from a user. At step 400, a communication quality with an addressee is determined. At step 402, it is determined if an intermediary is needed. If not, the packet is sent to the network at step 410. If an intermediary is needed at step 402, then at step 404 the intermediary is attempted to be found in the communication quality table. At step 406, it is determined if the intermediary is found. If not, the packet is sent to the network at step 410. Otherwise, at step 408 the packet is formed for the intermediary before it is sent to the network at step 410.

A packet may be received from a network. At step 412, it is determined if the packet is to be resent. If so, the packet is formed for an addressee at step 414 and then it is sent to the network at step 410. If not, it is determined at step 416 if the packet is a service packet. If not, the racket is sent to the user at step 420. If so, the packet of the communication quality table is processed at step 418.

The example given above does not limit other possible options for the implementation of the method for data transmission in existing WLANs claimed herein.

The invention claimed is:

1. A method for transmitting information in a wireless local area network having transceiving devices capable of operating in a peer-to-peer mode, the method comprising:
    determination by each of a plurality of transceiving devices of the quality of communication with other transceiving devices of the network;
    transmission by each of the plurality of transceiving devices of the network of an identification signal that includes data on quality of communication with other transceiving devices of the network;
    storage by each of the plurality of transceiving devices of the network of received data about the quality of communication between transceiving devices of said network;
    transmission of information by one of the plurality of transceiving devices of the network to an addressee from among transceiving devices of said network by a route selected based upon the stored data about the quality of communication between transceiving devices of the network and a specified communication threshold value.

2. The method of claim 1 wherein the specified communication threshold value is based upon a bandwidth requirement.

3. The method of claim 1 wherein the reception of said identification signal is performed when an antenna beam is oriented in the direction of said transceiving device that is in transmission mode.

4. The method of claim 1 wherein the quality of communication in the peer-to-peer operation mode with said addressee is taken as a specified communication threshold value.

5. The method of claim 1 wherein the quality of communication is determined based on the level of a signal being received.

6. The method of claim 1 wherein the quality of communication is determined based on the ratio of a received signal level to noise level.

7. The method of claim 1 wherein transceiving devices belonging to said information transmission route transmit information (intended for an addressee) to one another at a rate determined based on data on quality of communication between them.

8. The method of claim 1 wherein said stored data on the quality of communication are taken as current values for subsequent transmission of information to said addressee.

9. The method of claim 1 wherein the cycle of said determination of the quality of communication and storage of said data on communication quality is repeated periodically.

10. The method of claim 9 wherein said determination of the quality of communication and storage of said data on communication quality is periodically repeated.

11. The method of claim 9 wherein said data on communication quality stored are replaced with new data on communication quality.

12. The method of claim 9 further comprising:
    comparing the stored data about the quality of communication between transceiving devices of the network with new data about the quality of communication between transceiving devices of the network and when the difference between data values of the stored data and the new data exceeds a specified value, transmitting more frequently the identification signal that includes data on quality of communication with other transceiving devices of the network.

13. A method for transmitting information in a wireless network having a plurality of transceiving devices capable of operating in a peer-to-peer mode, the method comprising:
    determining the quality of communication links with the other transceiving devices of the network;
    periodically transmitting an identification signal that includes data on the quality of communication links with other transceiving devices of the network;
    receiving, from at least one other of the plurality of transceiving devices, an identification signal that includes data on the quality of communication links with the transceiving device that transmitted the identification signal;
    comparing stored data on the quality of communication links with new data on the quality of communication links; and
    storing the new received data on the quality of communication links;
    transmitting information to an addressee from among the plurality of transceiving devices by a route selected based upon the stored received data and a specified threshold value and a communication quality criteria.

14. A transceiver for transmitting information in a wireless network having a plurality of transceiving devices capable of operating in a peer-to-peer mode, the transceiver comprising:
- a memory;
- a controller coupled to the memory and configured to determine the quality of communication links with the other transceiving devices of the network,
- transmit an identification signal that includes data on the quality of communication links with other transceiving devices of the network,
- receive, from at least one other of the plurality of transceiving devices, an identification signal that includes data on the quality of communication links with the transceiving device that transmitted the identification signal,
- storing the received data on the quality of communication links in the memory, and
- transmit information to an addressee from among the plurality of transceiving devices by a route selected based upon the stored received data and a specified threshold value and a communication quality criteria; and
- a direction-agile antenna configured to be oriented in a direction to optimize transmission and reception of each received data packet.

15. The transceiver of claim 14 wherein the controller is further configured to compare stored data on the quality of communication links with new data on the quality of communication links and when the difference between data values of the stored data and the new data exceeds a specified value, then increasing a frequency of periodically transmitting the identification signal.

* * * * *